United States Patent
Kang

(10) Patent No.: US 7,383,036 B2
(45) Date of Patent: Jun. 3, 2008

(54) HOME NETWORK SYSTEM

(75) Inventor: Sung Hwan Kang, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 10/475,336

(22) PCT Filed: Apr. 10, 2002

(86) PCT No.: PCT/KR02/00646

§ 371 (c)(1),
(2), (4) Date: Oct. 21, 2003

(87) PCT Pub. No.: WO03/073694

PCT Pub. Date: Sep. 4, 2003

(65) Prior Publication Data

US 2005/0101312 A1    May 12, 2005

(30) Foreign Application Priority Data

Feb. 28, 2002 (KR) ................... 2002-10934

(51) Int. Cl.
*H04M 3/42* (2006.01)
*H04Q 7/22* (2006.01)
*H04Q 7/38* (2006.01)

(52) U.S. Cl. ............... 455/414.1; 455/422.1; 370/340; 709/217; 709/219; 709/231

(58) Field of Classification Search ............ 455/422.1, 455/414.1; 370/340; 709/217, 219, 231
See application file for complete search history.

(56) References Cited

U.S. PATENT DOCUMENTS 6,121,593 A * 9/2000 Mansbery et al. .......... 219/679
6,198,479 B1 * 3/2001 Humpleman et al. ....... 715/733
2001/0025349 A1 * 9/2001 Sharood et al. ............. 713/340
2001/0034586 A1 * 10/2001 Ewert et al. ................ 702/188
2001/0034754 A1 * 10/2001 Elwahab et al. ............ 709/201
2002/0011923 A1    1/2002 Cunningham et al.
2002/0083342 A1 * 6/2002 Webb et al. ................. 713/201

FOREIGN PATENT DOCUMENTS

| KR | 10-2001-0037660 | 5/2001 |
| KR | 10-0357045 | 9/2001 |
| KR | 2001-0084084 | 9/2001 |
| KR | 2001-0085803 | 9/2001 |
| WO | WO 00/65774 | 11/2000 |
| WO | WO 01/80494 A1 * | 10/2001 |

* cited by examiner

*Primary Examiner*—William Trost
*Assistant Examiner*—Ariel Balaoing
(74) *Attorney, Agent, or Firm*—McKenna Long & Aldridge LLP

(57) ABSTRACT

A home network system is disclosed, which includes a remote control server for controlling transmitting/receiving data at a long distance by WEB server connected to an external PC or WAP server connected to a communication terminal and by home network; an internal PC at home; and a network controller connected to the internal PC by wire or wireles network, for providing a user interface of a graphic user interface (GUI) type to a browser of the internal PC, monitoring and controlling the network appliance according to user control command by the user interface, the browser and the remote control server, and transmitting results to the internal PC and the remote control server.

3 Claims, 2 Drawing Sheets

HOME NETWORK SYSTEM

TECHNICAL FIELD

The present invention relates to a home network system that is applicable a variety of network environments.

BACKGROUND ART

Although 'Home Automation' first started to automatically control home appliances from somewhere in the house or from a remote place, the appliances were not connected to each other, and one had to deal with each appliance individually by using telephone or infrared rays. Recently however, all electronic apparatuses are networked together with help of a communication means, and a home network system for integrative control on the network through a controller is going to be available to the public in no time.

As depicted in FIG. 1, the home network system includes a communication bus for interconnecting a plurality of home appliances, such as, refrigerator, washing machine, personal computer (PC), etc.

Particularly, FIG. 1 illustrates a case in which every apparatus' micom has a serial communication function and is directly connected to the communication bus. If the micom does not have the serial communication function or uses a power line as communication line, a separate communication module is needed to configure the home network.

As mentioned before, the home network generally includes a controller for controlling network system. However, now that almost every house has a personal computer, one can simply install an application program for controlling the network system into the personal computer and use that as network controller.

The problem with the conventional home network system was that it could control appliances only through a specific type of controller.

In other words, regardless of the facts that every house has a plurality of personal computers and each computer configures wired or wireless network together, the conventional technology still required to control appliances only through a computer that is designated as the controller of the home network system. Hence, one cannot control a wanted apparatus through another computer.

DISCLOSURE OF INVENTION

It is, therefore, an object of the present invention to provide a home network system that is applicable to a variety of network environments for more efficient network control.

To achieve the above object, there is provided a home network system, which includes a remote control server for controlling transmitting/receiving data at a long distance by WEB server connected to an external PC or WAP (Wireless Application Protocol) server connected to a communication terminal and by home network; at least one internal PC at home; and a network controller, which is connected to the internal PC by wire or wireless network, for providing a user interface of a GUI (Graphic User Interface) type to a browser of the internal PC, monitoring and controlling the network appliance according to user control command by the user interface, the browser and the remote control server, and transmitting results to the internal PC and the remote control server.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Watching the development of technologies at present, one can easily imagine that a future home network system will be able to control home network appliances at home in addition to from a remote place.

Figure 1:
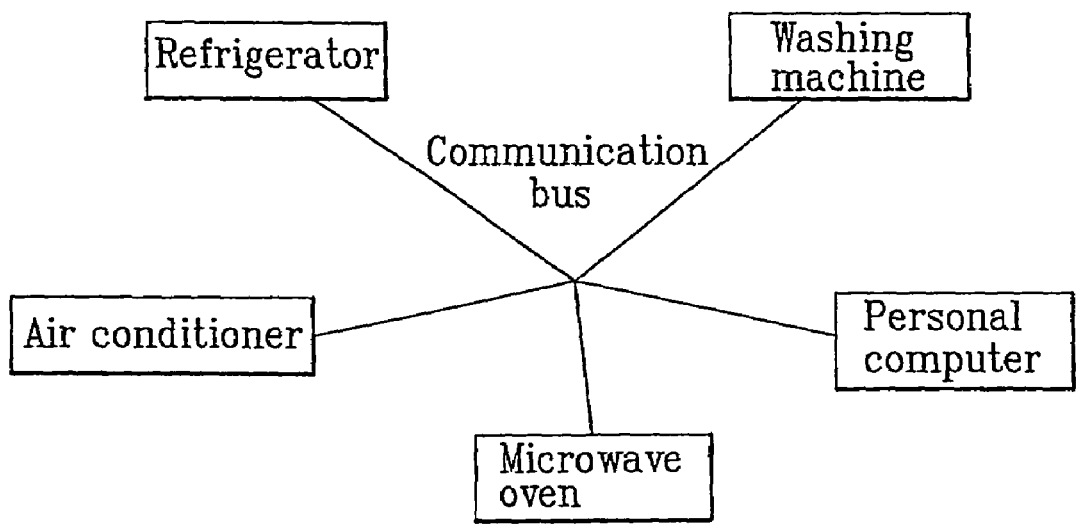
FIG. 1 is a block diagram depicting rough configuration of a general home network system.
Figure 2:
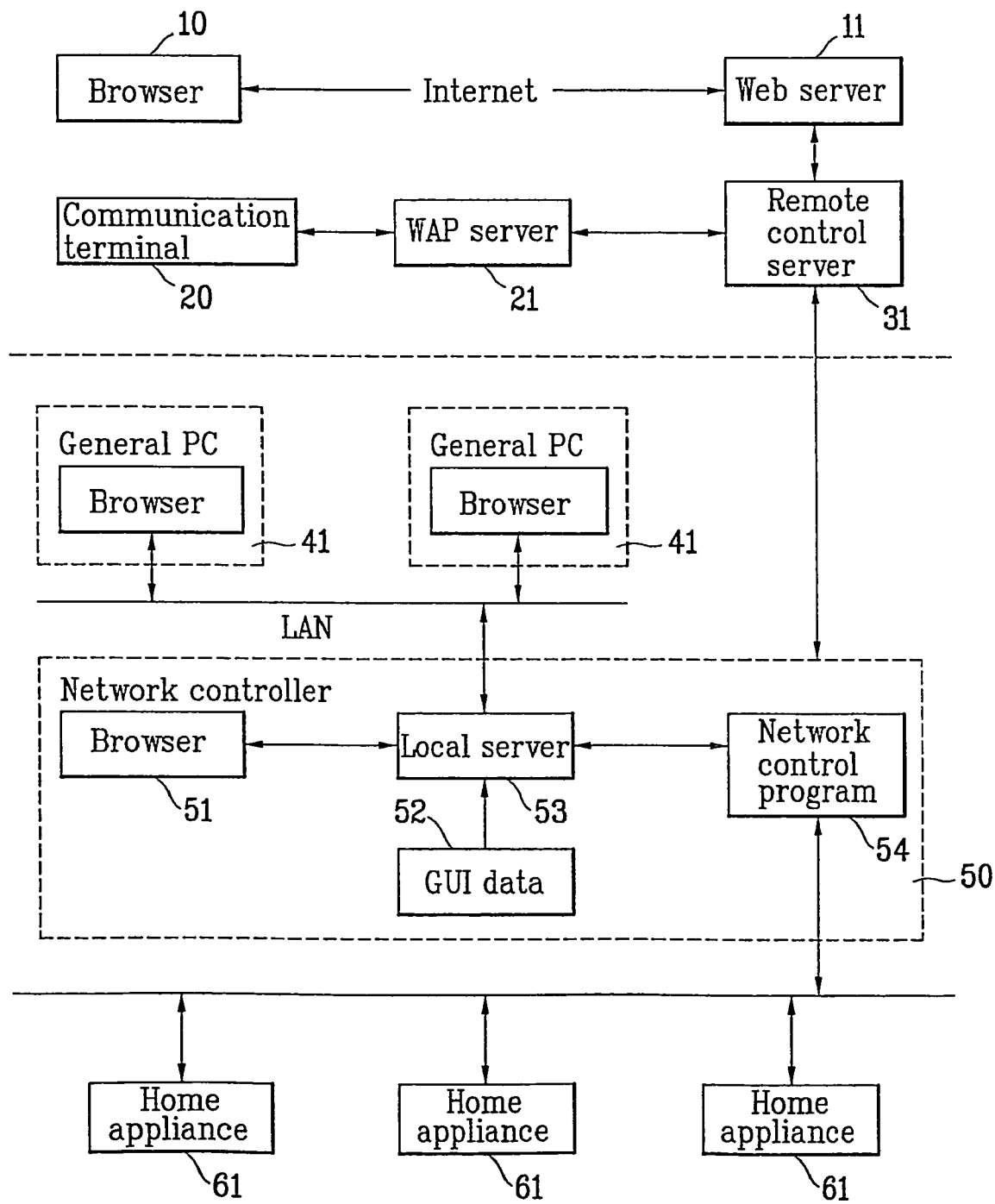
FIG. 2 is a block diagram depicting configuration of a home network system in accordance with a preferred embodiment of the present invention.

Hence, home network system could be divided largely into external network environment and internal network environment, namely home network environment. First of all, external network environment of the home network system embodying the principles of the present invention is now explained with reference to FIG. 2.

As shown in the drawing, a user accesses to web server 11, a browser 10 of an external PC, through Internet, or to WAP server, a wireless application protocol, by using a portable communication terminal 20, and controls home appliance 61 or inputs a monitoring command. Then, the corresponding command is transmitted to a network controller at home through a remote control server 31 for controlling communication toward home from outside.

More specifically speaking, home network environment includes an internal PC 41, and a network controller 50. Here, the network controller 50 connected to the internal PC 41 by wire (LAN) or wireless network (for example, through Bluetooth) provides a graphic user interface (GUI) to a browser of the internal PC 41, monitors and controls the network appliance 61 in accordance with user control command by the user interface, the browser and the remote control server 31, and transmits results to the internal PC 41 and the remote control server 31.

Here, the above-described operations are, performed by local server 53 mounted on the network controller 50. That is, the local server 53 provides a GUI to the browser itself and the browser of the internal PC 41 at the request of the user; monitors and controls operation of the network appliance 61 by employing the network control program under the user control command having been input in each browser and the user control command having been input through the remote control server 31; and transmits results thereof to the remote control server 31 or the internal PC 41, in order to display the results thereon in addition to the local server 53 itself.

Described next is more details on how the home network system of the present invention works.

Before getting into further details, there is one thing that should be dealt with first. That is, if one wants to control network appliances through Internet, he/she must be a member of an Internet site that provides the corresponding service. In other words, a user should network an appliance 61 and then connects to a corresponding Internet site. After that, the user inputs his/her ID and password and becomes a member of that site. Once the user becomes a member, he/she may download the appliance control program from the corresponding site, or use a separate CD or diskette to install and execute the control program. Later, as for using the control program, the user can confirm his/her membership by using the ID and the password that had been input before.

In this manner, the initial step for network control is completed, and the user can control appliances from external network environment. Once the initial step is done, the user makes an access to web server 11 through Internet by using the browser 10 of the office PC connected to Internet, or to WAP server 21 by using a communication terminal 20 like a cellular phone. Using the network control program provided the web server 11 or the WAP server 21, the user inputs an appliance monitoring or appliance control command.

Then, web server 11 or WAP server 21 transmits the monitoring command or control command to network controller 59 through remote control server 31.

Network controller 50 controls and monitors operation of network appliance 61 under the control command and the monitoring command, and again sends results thereof to web server 11 or WAP server 21 through remote control server 31.

After that, web server 11 or WAP server 21 displays the appliance control result or monitoring result on the browser's screen 10 of the user PC through Internet or on the display window of communication terminal 20.

In such manner, the user can check the operation state of network appliances through PC or communication terminal. Depending on how the user sets up, the operation state of network appliances could be automatically monitored and displayed.

In the meantime, in case of controlling network appliances in the internal network environment, the user inputs an appliance monitoring command or operation control command on GUI screen that is provided by local server 53 of network controller 50 connected to internal PC 41 by wire or wireless network.

Later, local server 53 controls or monitors operation of network appliance 61 based on network control program 54 under the appliance monitoring command or operation control command, and displays results thereof on the screen of internal PC 41 through the GUI screen again.

Hence, the user, without using network controller 50, can input monitoring command or operation control command through PC 41 placed in each room to control and monitor operation state of home appliance 61.

Even when the user has to use network controller 50, except for data transmission to outside, the user can have the same benefits, that is, the user is provided with a GUI interface and able to control and monitor home appliances according to user command by using network control program 54.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The present invention enables users to share network controller's program and user interface if home appliances are networked through a network controller or LAN, without requiring a separate network controller or program for use of network control.

Therefore, the present invention is advantageous in viewpoints that users can save system establishing costs and easily control home appliances through network control, and efficiency of home network system is improved.

What is claimed is:

1. A home network system, comprising:
   a remote control server for controlling transmitting/receiving data by WEB server connected to an external PC or WAP server connected to a communication terminal and by a home network;
   at least one internal PC; and
   a network controller, connected to the internal PC by a wire or a wireless network, for:
      concurrently providing a user interface of a graphic user interface (GUI) type to a browser of the internal PC and a browser of the network controller;
      monitoring and controlling a network appliance corresponding to a user control command by the user interface, the browser and the remote control server, respectively; and
      transmitting results to the internal PC and the remote control server, wherein the network controller includes a browser for monitoring the network appliance and providing an operation control environment of the network appliance.

2. The home network system according to claim 1, wherein the network controller comprising:
   a network control program for performing the monitoring and the operation control of the appliance;
   a graphic user interface (GUI) for generating a screen associated with a control of the network appliance; and
   a local server for providing GUI to the browser of the network controller and a browser of the internal PC according to a request of the user, monitoring the operation states and controlling the operation of a corresponding network appliance by employing the network control program under a user control command which is inputted on each browser and a user control command inputted through the remote control server, and transmitting results thereof to the remote control server or the internal PC for display.

3. The home network system according to claim 2, wherein the local server is installed in the network controller in the form of software.

* * * * *